United States Patent [19]

Yacobi

[11] Patent Number: 4,613,519
[45] Date of Patent: Sep. 23, 1986

[54] ELECTRON-BEAM-INDUCED INFORMATION STORAGE IN HYDROGENATED AMORPHOUS SILICON DEVICE

[75] Inventor: Ben G. Yacobi, Denver, Colo.

[73] Assignee: The United State of America as represented by the United States Department of Energy, Washington, D.C.

[21] Appl. No.: 713,352

[22] Filed: Mar. 18, 1985

[51] Int. Cl.[4] .............................................. B05D 3/06
[52] U.S. Cl. ...................................... 427/39; 365/113; 365/114; 365/118; 427/35; 427/86
[58] Field of Search .................... 427/35, 36, 43.1, 38, 427/39, 86; 365/113, 114, 118

[56] References Cited

U.S. PATENT DOCUMENTS 3,750,117 7/1973 Chen et al. .......................... 365/113
3,761,895 9/1973 Ellis et al. ............................ 365/118

OTHER PUBLICATIONS

Carlson et al., Seri Report PR-O-8254-F Solar Energy Research Institute, Golden, Colo. (1980).
Carlson et al., Seri Report PR-O-9372-5 Solar Energy Research Institute, Golden, Colo. (1982).
Bosch Appl. Phys. Lett., vol. 40, No. 1, pp. 8–10 (1982).
Dersch et al. Appl. Phys. Lett., vol. 38, No. 6, pp. 456–458 (1981).
Inoue et al. Solar Cells, vol. 1, pp. 233–236 (1979).
Janai et al. J. Appl. Phys., vol. 53, No. 3, pp. 1385–1386 (1982).
Kirkpatrick et al. J. Vac. Sci. Technol., vol. 15, No. 3, pp. 841–844 (1978).
Leamy J. Appl. Phys., vol. 53, No. 6, pp. R51–R80 (1982).
Osterwald et al. Solar Cells, vol. 10, pp. 1–5 (1983).
Pankove et al. Appl. Phys. Lett., vol. 37, No. 8, pp. 705–706 (1980).
Schade et al. Journal de Physique, Colloque C4, Supplement Au, No. 10, Tome 42, pp. C4-327–C4-330 (1981).
Street et al. Philosophical Magazine B, vol. 40, No. 6, pp. 451–464 (1979).
Yacobi Appl. Phys. Lett., vol. 44, No. 7, pp. 695–697 (1984).

*Primary Examiner*—John H. Newsome
*Attorney, Agent, or Firm*—Kenneth L. Richardson; John M. Albrecht; Judson R. Hightower

[57] ABSTRACT

A method for recording and storing information in a hydrogenated amorphous silicon device, comprising: depositing hydrogenated amorphous silicon on a substrate to form a charge-collection device; and generating defects in the hydrogenated amorphous silicon device, wherein the defects act as recombination centers that reduce the lifetime of carriers, thereby reducing charge-collection efficiency; and thus in the charge-collection mode of scanning probe instruments, regions of the hydrogenated amorphous silicon device that contain the defects appear darker in comparison to regions of the device that do not contain the defects, leading to a contrast formation for pattern recognition and information storage, in the device, which darkened areas can be restored to their original charge-collection efficiency by heating the hydrogenated amorphous silicon to a temperature of about 100° C. to 250° C. for a sufficient period of time to provide for such restoration.

23 Claims, 7 Drawing Figures

1000μm

100μm

ELECTRON-BEAM-INDUCED

INFORMATION STORAGE

IN HYDROGENATED AMORPHOUS

SILICON

SERI 1983

$\overline{100 \mu m}$

FIG.2

$\overline{100\mu m}$

ELECTRON-BEAM-INDUCED INFORMATION STORAGE IN HYDROGENATED AMORPHOUS SILICON DEVICE

CONTRACTUAL ORIGIN OF THE INVENTION

The U.S. Government has rights in this invention pursuant to Contract No. DE-AC02-83CH10093 between the U.S. Department of Energy and the Solar Energy Research Institute, a Division of the Midwest Research Institute.

BACKGROUND OF THE INVENTION

1. Field of the Invention

The present invention relates to a reversible method for recording and storing information in hydrogenated amorphous silicon devices.

2. Description of the Prior Art

Substantial research programs relating to the use of hydrogenated amorphous silicon material in photovoltaic technology, that is, in solar cells, are currently in progress. Hydrogenated amorphous silicon material may also have utility in other areas, such as in vidicons, electrophotography and optical recording.

Research on the various applications of hydrogenated amorphous silicon is discussed, for example, in Proceedings of the International Conferences on Amorphous and Liquid Semiconductors: 1979, J. Non-Cryst. Solids, Vols. 35 and 36, 1981 the Journal of Physics (Paris), Vol. 42, Suppl. 10, C4, and 1983, J. Non-Cryst. Solids, Vols. 59 and 60.

The application of hydrogenated amorphous silicon in optical recording was reported by M. A. Bosch, Applied Physics Letters, vol. 40, page 8 (1982), M. Janai et al. in the Journal of Applied Physics, vol. 53, page 1385 (1982), and P. John et al. in Applied Physics Letters, vol. 45, page 39 (1984).

SUMMARY OF THE INVENTION

Against the foregoing background, it is a general object of the present invention to provide a new method for recording and storing information in hydrogenated amorphous silicon devices.

It is another general object of the present invention to provide a reversible method for recording and storing information in hydrogenated amorphous silicon devices.

Additional objects, advantages, and novel features of the invention shall be set forth in part in the description that follows, and in part will become apparent to those skilled in the art upon examination of the following disclosure, or may be learned by the practice of the invention. The objects and advantages of the invention may be realized and attained by means of the instrumentalities and in combinations particularly pointed out in the appended claims.

The present invention relates to a method for recording and storing information in a hydrogenated amorphous silicon device, comprising:

(a) depositing hydrogenated amorphous silicon on a suitable substrate to form a charge collecting device; and (b) generating defects in said hydrogenated amorphous silicon device, said defects acting as recombination centers that reduce the lifetime of carriers, thereby reducing charge collection efficiency. Thus in the charge-collection mode of scanning probe instruments, regions of said hydrogenated amorphous silicon device that contain the said defects appear darker in comparison to regions of the device that do not contain said defects, leading to a contrast formation for pattern recognition and information storage.

BRIEF DESCRIPTION OF THE DRAWINGS

The accompanying micrographs obtained with a scanning electron microscope, which are incorporated in and form a part of the specification, illustrate preferred embodiments of the present invention and, together with the description, serve to explain the principles of the invention.

FIG. 2 is a micrograph of a charge-collection image of electron-beam "writing" on a p-i-n device;

DESCRIPTION OF THE PREFERRED EMBODIMENTS

In accordance with the present invention, defects are generated in amorphous hydrogenated silicon devices. These defects act as recombination centers that reduce the lifetime of carriers, thereby reducing charge collection efficiency. Thus, in the charge collection mode of scanning probe instruments, regions of the hydrogenated amorphous silicon device that contain the defects appear darker in comparison to regions of the device that do not contain the defects. This leads to a contrast formation for pattern recognition and information storage.

Defects in hydrogenated amorphous silicon can be generated by electron beam bombardment. According to studies by Schade et al, J. Physics (Paris) 42, Suppl. 10, C4-327 (1981), electron bombardment in hydrogenated amorphous silicon introduces dangling bonds by breaking weak Si—Si bonds and, possibly indirectly, Si—H bonds as well.

Increasing the number of dangling bonds causes a higher density of states in the gap. These states act as recombination centers that reduce the lifetime of carriers. Thus, in the charge-collection mode, electron-irradiated areas, or spots, appear darker in comparison to the unbombarded regions of the device. These dark areas represent the recorded and stored information.

Electron beam bombardment can be generated by an electron probe instrument, such as a scanning electron microscope (SEM). Other means for generating defects by bombardment include x-rays, photon irradiation, ion beams, and charged particles.

The hydrogenated amorphous silicon can be deposited on a suitable substrate by such means as glow-discharge decomposition of silane ($SiH_4$), by sputtering techniques, or by means of chemical vapor deposition (CVD).

In one example, hydrogenated amorphous silicon was deposited by the glow-discharge decomposition of silane. Palladium was used for Schottky barriers, and p-i-n devices were fabricated on stainless steel substrates with a thin aluminum top contact. After irradiation by a 30-KeV beam of about 1.0 nA in a raster mode of an area of about 0.1 $mm_2$, a decrease in the charge collection, or electron-beam-induced current (EBIC) signal, occurred.

A scanning electron microscope (SEM) was used to observe these effects.

Stronger effects could also be observed in a raster mode of smaller areas (higher magnifications) with the same beam current of about 1 nA, or at lower magnifications with a higher beam current. Only a few seconds were sufficient for the almost complete disappearance of the EBIC signal in a spot mode. Electron probe size was on the order of 0.1 $\mu$m.

Figure 1A:
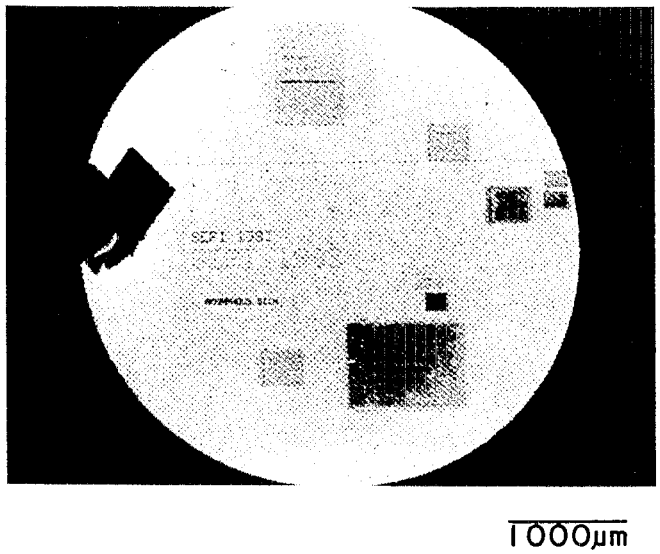
FIG. 1(a) is a micrograph of electron-beam "writing" on a Schottky device.

Different levels of darkening of the EBIC in a raster mode are shown in FIG. 1(a), which is an example of electron beam "writing" on a Schottky device. In FIG. 1(a), the charge-collection image of the device is shown at low magnification. The electron-beam writing was accomplished by using a computer controlled beam system, specifically a Tracor Northern digital beam control system attached to the microscope, which enabled "writing" directly on devices using the electron-beam-induced darkening effect in the charge-collection mode. Such writing was performed on both Schottky and p-i-n devices.

Figure 1B:
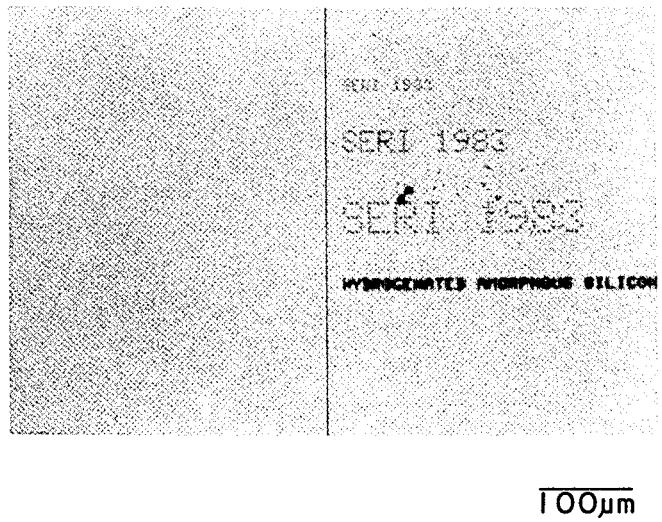
FIG. 1(b) is a bipartite micrograph showing a magnified rectangular portion at the top of FIG. 1(a)

FIG. 1(b) represents a bipartite micrograph showing the secondary electron image (left half) and the charge-collection image (right half) of the magnified rectangular area at the top of FIG. 1(a). The electron-beam energy is 30 keV, and the SEM electron-beam current is about 1 nA.

FIG. 2 is a micrograph showing the charge-collection image of electron-beam writing on a p-i-n device. The electron-beam energy is 30 keV, and the SEM electron-beam current is about 1 nA.

The room temperature lifetime of the information stored in accordance with the method of the present invention is at least seven months. Observations of the stored information have been made for seven months on a monthly basis, without any noticeable change, and are continuing.

It has been found that the stored information can be completely erased by annealing the hydrogenated amorphous silicon devices at elevated temperatures, for example, by heating in an oven at temperatures of about 100° C. to 250° C. for at least about 15 to 60 minutes. Complete recovery of the charge-collection signal is obtained.

In the writings produced in the devices, no visible damage to the bombarded surface was observed in any cases in the secondary electron imaging (SEI) mode of the SEM, as can be seen by the left half of the bipartite micrograph in FIG. 1(b). Therefore, the observed effects in the charge collection contrast are not caused by the surface contamination that often accompanies investigations using electron probe instruments.

The charge-collection contrast depends on the charge-collection efficiency of unbombarded portions of the device, and on the extent of the electron beam-induced damage in bombarded areas.

As noted earlier, EBIC signals in a spot mode had always decayed to close to zero in only a few seconds. Dark spots in the micrograph correspond to areas with no measurable charge collection.

Also noted earlier, annealing leads to the removal of defects. In one particular investigation, a p-i-n device was annealed at about 200° C. for 15 minutes, and stored information was completely erased as shown in FIG. 3, which contains a series of charge-collection images for the same p-i-n device.

Figure 3A:
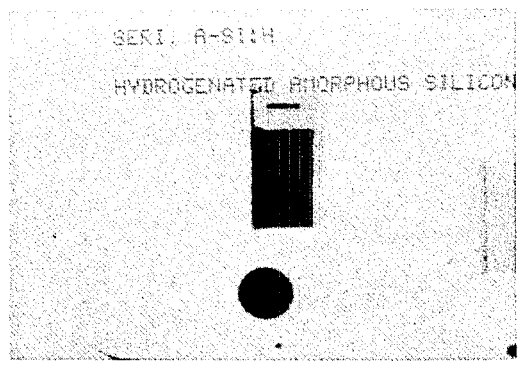
FIGS. 3(a), (b), and (c) are charge-collection images of the same p-i-n device.
Figure 3B:
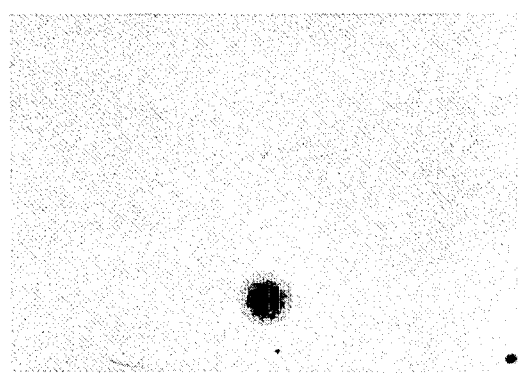
Figure 3C:
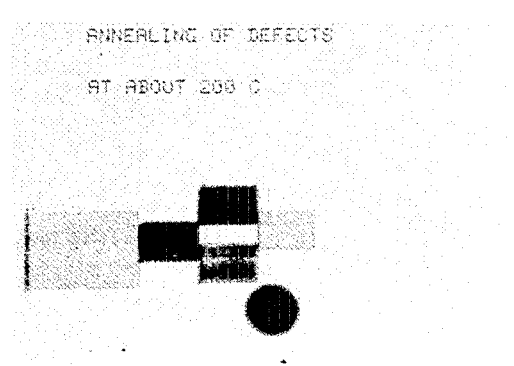

FIG. 3(a) shows a micrograph of initial electron-beam writing and pattern formation. FIG. 3(b) shows the image after annealing at about 200° C. for 15 minutes. Note that the writing and pattern are erased. FIG. 3(c) shows new writing on the same part of the device. Dark spots are fabrication defects, possibly pin holes, that were always present in this device and serve to identify the erased area after annealing. The electron beam energy is 30 keV, and the SEM electron-beam current is about 1 nA.

The spatial resolution of the EBIC depends upon the probe size, generation volume, and diffusion length. For example, the size of the generation volume of silicon for a beam voltage of 30 keV, is on the order of 10 $\mu$m, which is much larger than the probe size of about 0.1 $\mu$m and the diffusion length, which is about 0.4 $\mu$m.

Therefore, generation volume probably determines the spatial resolution of the beam writing. Another consideration here is that in silicon, the generation volume is not exactly spherical, but rather pear-shaped. These considerations, taken together with the fact that the thicknesses of the devices used in demonstrating this invention were on the order of 0.5 $\mu$m, suggests a roughly estimated spatial resolution of a few microns. It is expected that the spatial resolution on the submicron scale can be also obtained in thinner devices.

Figure 4:
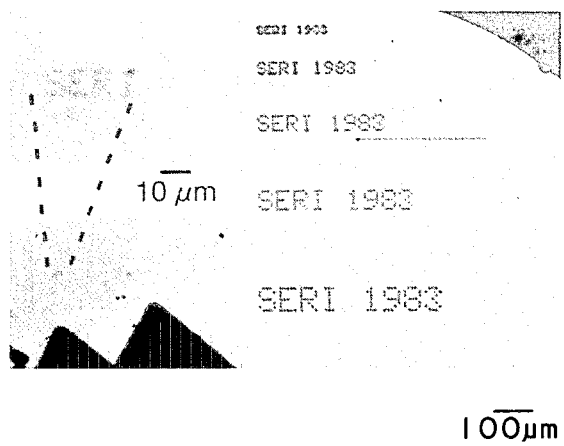
FIG. 4 is a micrograph of another charge-collection image on a p-i-n device.

FIG. 4 is a micrograph of the charge-collection image of a p-i-n device, showing an example of writing accomplished at high magnification. The inset on the figure represents a magnified area of the device, denoted by dotted lines, and demonstrates that a spatial resolution of a few microns can be achieved easily. The electron-beam energy used in this case is 30 keV, and the SEM electron-beam current is about 1 nA.

"Reading" of stored information can be accomplished by using the EBIC in a raster mode in an electron probe instrument, such as a SEM. Reading can also be accomplished with light-beam-induced current (LBIC), also known as optical-beam-induced current (OBIC), utilizing a scanning light spot technique or a fixed-beam moveable stage laser scanner. With a light spot on the order of a few microns, a spatial resolution of about the same order in the reading mode can be achieved.

Recording and storing information in a charge collection device can also be accomplished with hydrogenated amorphous silicon sandwiched between two ohmic contacts. Reading of the stored information can be accomplished by means of beta conductivity in scanning electron probe instruments. Reading can also be accomplished by means of photoconductivity using a scanning light spot technique, or a fixed beam moveable stage laser scanner. Discussion of beta conductivity has been made by Leamy in Journal of Applied Physics, vol. 53, page R51 (1982).

It should be noted that no visible damage with the electron beam was introduced during the reading period in a raster mode of areas on the order of 10 mm$^2$.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to falling within the scope of the invention as defined by the claims which follow.

The embodiments of the invention in which an exclusive property or privilege is claimed are defined as follows:

1. A method for recording and storing information in a hydrogenated amorphous silicon device, comprising:
   (a) depositing hydrogenated amorphous silicon on a suitable substrate to form a charge collection device; and
   (b) generating defects in said hydrogenated amorphous silicon device, said defects acting as recombination centers that reduce the lifetime of carriers, thereby reducing charge collection efficiency and thus in the charge collection mode of scanning probe instruments, regions of said hydrogenated amorphous silicon device that contain said defects appear darker in comparison to regions of the device that do not contain said defects, leading to a contrast formation for pattern recognition and information storage.

2. The method of claim 1, wherein the hydrogenated amorphous silicon is deposited on the substrate by means selected from the group consisting of glow discharge, evaporation, sputtering, and chemical vapor deposition.

3. The method of claim 1, wherein the defects in step (b) are generated by bombardment means selected from the group consisting of electron beams, X-rays, photon beams, ion beams and charged particles.

4. The method of claim 1, wherein the stored information can be erased by annealing said device, thereby enabling recovery of the charge collection signal.

5. The method of claim 4, wherein annealing is performed at temperatures of about 100°–250° C.

6. The method of claim 1, wherein said device incorporates a Schottky barrier.

7. The method of claim 1, wherein said device incorporates a p-n junction.

8. The method of claim 1, wherein said device is a p-i-n device.

9. The method of claim 1, wherein reading of the stored information can be accomplished by means selected from the group consisting of electron beam induced current, or light beam induced current.

10. The method of claim 1, wherein said information is in the form of patterns, letters, symbols, numbers, and combinations thereof.

11. The method of claim 2, wherein the hydrogenated amorphous silicon is deposited on the suitable substrate by means selected from the group consisting of glow discharge, evaporation and sputtering.

12. The method of claim 2, wherein the hydrogenated amorphous silicon is deposited on the suitable substrate by chemical vapor deposition.

13. The method of claim 3, wherein the defects in step (b) are generated by electron beam bombardment.

14. The method of claim 3, wherein the defects in step (b) are generated by X-ray bombardment.

15. The method of claim 3, wherein the defects in step (b) are generated by photon irradiation.

16. The method of claim 3, wherein the defects in step (b) are generated by ion beam bombardment.

17. The method of claim 3, wherein the defects in step (b) are generated by charged particle bombardment.

18. The method of claim 3, wherein the electron beam bombardment is controlled by means of a computer or microprocessor for digital electron beam control.

19. The method of claim 1, wherein said substrate is electrically conductive.

20. A method for recording and storing information in a charge collection device, comprising a hydrogenated amorphous silicon sandwiched between two ohmic contacts, wherein reading of the stored information is accomplished by means of:
   (a) beta conductivity in scanning electron probe instruments; or
   (b) photoconductivity using a scanning light spot technique or fixed-beam moveable stage laser scanner.

21. A method of recording erasable information in a layer of hydrogenated amorphous silicon comprising the step of:
   (a) bombarding in a predetermined manner said hydrogenated amorphous silicon with an electron beam of sufficient energy for a sufficient time to produce regions of reduced charge-collection efficiency without producing observable structural damage or sufficient localized heating to substantially alter the physical state of the hydrogenated amorphous silicon in said layer, whereby the regions of reduced charge-collection efficiency can be distinguished from regions of normal charge-collection efficiency by use of the charge-collection mode of scanning probe instruments and thereby used to provide a medium for information storage and retrieval.

22. A method for erasing information presented in a hydrogenated amorphous silicon body represented by a pattern of reductions in the charge-collection efficiency of preselected regions of said body created by focused electron beam radiation of sufficient intensity and dose to produce said preselected regions of reduced charge-collection efficiency, without producing observable structural damage or sufficient localized heating to substantially alter the physical state of the hydrogenated amorphous silicon in said body comprising:
   the step of heating the irradiated hydrogenated amorphous silicon body to a temperature of at least about 100° C. to about 250° C. for a sufficient period of time to restore the charge collection efficiency of the previously irradiated regions to substantially the same charge-collection efficiency as the hydrogenated amorphous silicon body which was not so irradiated.

23. A method of reading information stored in a hydrogenated amorphous silicon body by the irradiation of preselected regions of said body with a focused electron beam of sufficient intensity to produce in said regions reduced charge-collection efficiency without visible structural damage or alteration of the amorphous state of said body, comprising the steps of:
   scanning said body with electron beam radiation in a manner that is capable of producing a charge-collection image with scanning electron microscope without substantially altering the charge-collection efficiencies of the previously irradiated and non-irradiated portions of said body, and
   recording differences in charge-collection efficiency which are representative of the stored information.

* * * * *